March 10, 1936.    C. C. FARMER    2,033,460
FLUID PRESSURE BRAKE
Original Filed Jan. 8, 1931    2 Sheets-Sheet 2
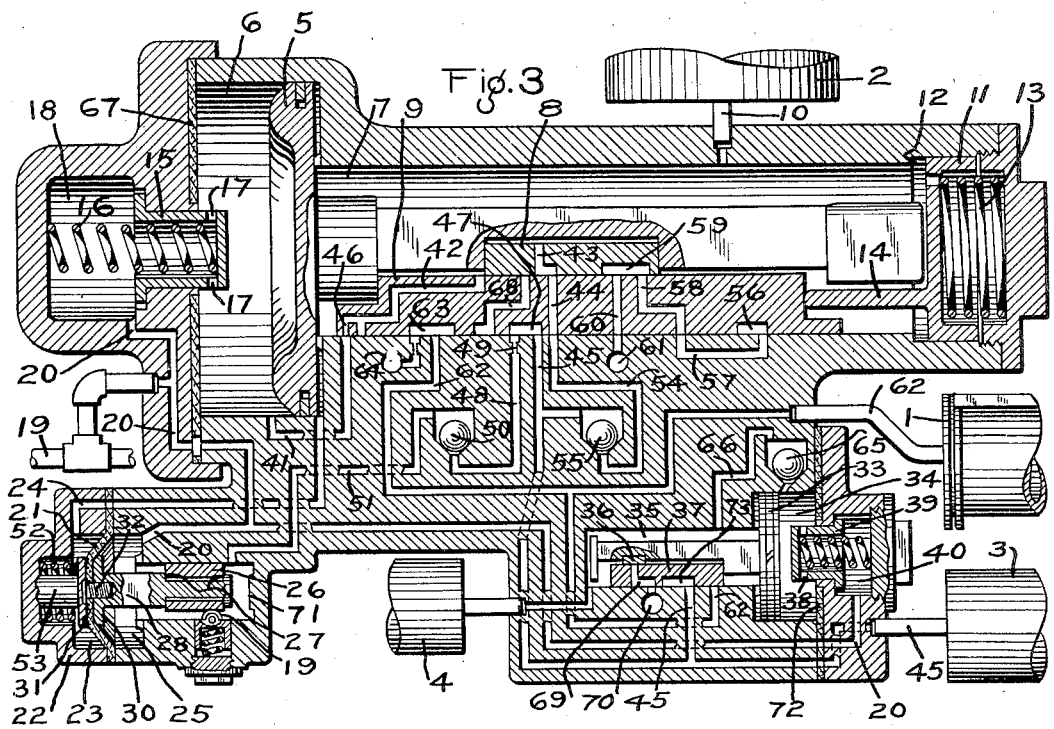
INVENTOR.
CLYDE C. FARMER
BY Wm. M. Cady
ATTORNEY.

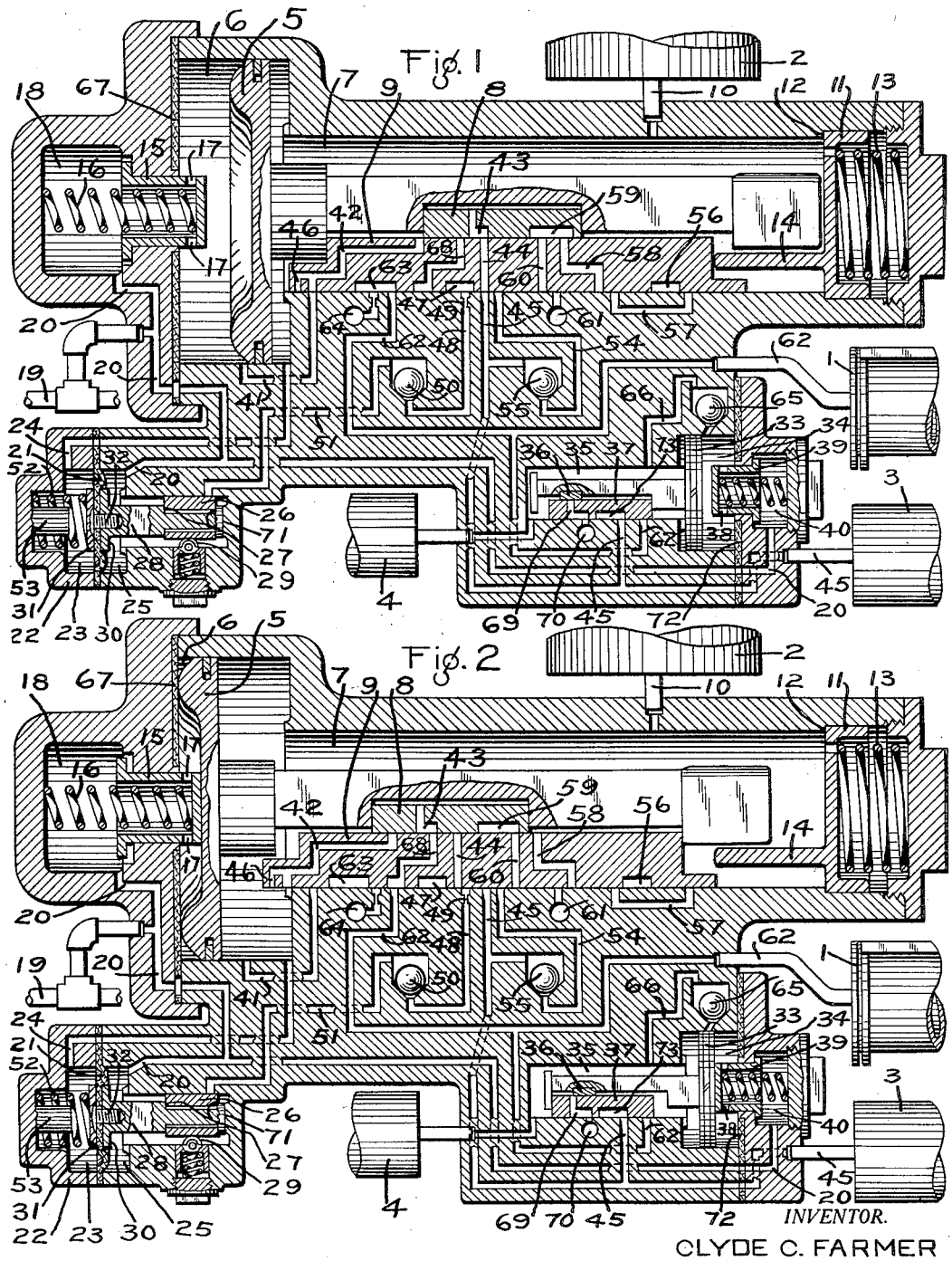

Patented Mar. 10, 1936

2,033,460

UNITED STATES PATENT OFFICE 2,033,460

FLUID PRESSURE BRAKE

Clyde C. Farmer, Pittsburgh, Pa., assignor to The Westinghouse Air Brake Company, Wilmerding, Pa., a corporation of Pennsylvania Application January 8, 1931, Serial No. 507,397
Renewed November 14, 1934

10 Claims. (Cl. 303—66)

This invention relates to fluid pressure brakes, and more particularly to a brake controlling valve device which operates in accordance with variations in brake pipe pressure to effect an application of the brakes and a release of the brakes after an application.

In releasing the brakes on a train after an application, it is customary for the engineer to move the usual brake valve device to release position, in which fluid at the relatively high pressure carried in the main reservoir is supplied directly to the brake pipe, and this high head of pressure in the brake pipe at the head end of the train is adapted to hasten the build up of pressure in the brake pipe at the rear end of the train so as to release the brakes and charge the brake equipments at the rear end of the train as rapidly as possible. When the brake equipments at the front end of the train become substantially fully charged to the normal pressure carried, the engineer moves the brake valve device to the usual running position in which the pressure of fluid supplied to the brake pipe is governed by the usual feed valve device.

The principal object of my invention is to provide an improved brake controlling valve device which will be operated by the initial high brake pipe pressure at the head end of a train to connect a normally charged reservoir to the brake pipe so as to permit equalization of fluid under pressure from said reservoir into said brake pipe and thereby augment the charging of the brake pipe.

Other objects and advantages will appear in the following more detailed description of my invention.

In the accompanying drawings; Fig. 1 is a diagrammatic view, mainly in section, of a brake equipment embodying my invention and showing the various devices in the usual full release position; Fig. 2 is another view of the equipment shown in Fig. 1, but with the various devices shown in service application position; and Fig. 3 is another view of the equipment shown in Fig. 1, but with the various devices shown in an inner or another release position.

As shown in the drawings, the fluid pressure brake equipment comprises a valve device, a brake cylinder 1, an auxiliary reservoir 2, an emergency reservoir 3, and a quick action reservoir 4.

The valve device comprises a brake control valve portion, a brake pipe charging valve portion and an emergency valve portion, said portions being preferably associated with each other in a single casing.

The brake control valve portion comprises a piston 5 having at one side a chamber 6 and at the opposite side a valve chamber 7 containing a main slide valve 9 and an auxiliary slide valve 8 adapted to be operated by said piston, said valve chamber being connected through a pipe 10 with the auxiliary reservoir 2.

Disposed in one end of the valve chamber 7 is a yielding resistance device for opposing movement of the piston 5 and slide valves 8 and 9 from the position shown in Fig. 1 to the position shown in Fig. 3, said device comprising a movable member 11 normally pressed into engagement with a shoulder 12 formed in the wall of chamber 7 by means of a spring 13, and having a finger 14 adapted to engage the main slide valve 9.

Extending into the piston chamber 6 is a member 15 adapted to be engaged by the piston 5 in service position, as shown in Fig. 2. Said member is acted upon by a spring 16 and is provided with a plurality of ports 17 through which communication is established from piston chamber 6 to chamber 18, which is at all times connected to the brake pipe 19 through a passage 20.

The brake pipe charging valve portion comprises a flexible diaphragm 21, the outer annular portion of which is secured between a face of the main casing and a cover plate 22. Said diaphragm has at one side a chamber 23 open to valve chamber 7 through a passage 24 and at the other side a chamber 25 connected to the brake pipe 19 through passage 20. Disposed in the valve chamber 25 is a slide valve 26 mounted between two shoulders 27 of a stem 28 and pressed into engagement with a seat by a spring-pressed roller 29. The stem 28 is provided with an enlarged head portion 30 adapted to engage one side of the diaphragm 21. A plate 31 is provided on the other side of said diaphragm and has a stem 32 extending through an opening in the diaphragm and having screw-threaded engagement in the stem 28. By this means the stem is secured to the diaphragm 21, so that deflection of said diaphragm will move the slide valve 26.

The emergency valve portion comprises a piston 33 having at one side a chamber 34 and at the opposite side a chamber 35 open to the quick action reservoir 4 and containing a main slide valve 37 and an auxiliary slide valve 36 adapted to be operated by said piston. The piston chamber 34 is open to the brake pipe 19, through a plurality of ports 38 in a spring-pressed stop 39, a chamber 40 and the passage 20.

In operation, to initially charge the brake equipment, fluid under pressure is supplied to the brake pipe 19 by operation of the usual brake valve device on the locomotive and flows from the brake pipe to the piston chamber 6 of the brake control device. At the rear end of the train where the rate of increase in brake pipe pressure is slow as compared to that at the front end, the brake control piston is moved to full release position into engagement with the stop member 11, as shown in Fig. 1. In this position, a passage 41 is connected to the piston chamber 6 and said passage also registers with a port 42 which extends through the main slide valve 9 and is uncovered by the slide valve 8. This permits fluid under pressure to flow from the piston chamber 6 to valve chamber 7 at such a rate as compared to the rate of increase in brake pipe pressure in the piston chamber 6 as to prevent sufficient pressure differential from being obtained to move said piston against the pressure of spring 13. Fluid under pressure thus supplied to the valve chamber 7 flows through pipe 10 to the auxiliary reservoir 2 and also through port 43 in the auxiliary slide valve 8, port 44 in the main slide valve 9 and passage and pipe 45 to the emergency reservoir 3, thus charging both of said reservoirs up to brake pipe pressure.

At the front end of the train, the rate at which fluid under pressure is initially supplied to the brake pipe and builds up in piston chamber 6 exceeds the flow capacity of port 42 to such an extent that a differential pressure is created on the piston 5 sufficient to shift said piston and the slide valves 8 and 9 to an inner or retarded recharge position shown in Fig. 3, in which position the spring 13 is compressed by movement of member 11.

In this inner position, fluid under pressure is supplied from piston chamber 6 through passage 41, a restricted port 46 which connects with port 42 in the main slide valve, and through port 42 to valve chamber 7. From valve chamber 7 fluid under pressure flows through pipe 10 to the auxiliary reservoir 2 and also through port 43 in the auxiliary slide valve, port 44 in the main slide valve, passage 54, past a ball check valve 55 and through passage and pipe 45 to the emergency reservoir 3, thereby charging said reservoirs at the front end of the train to brake pipe pressure.

In this inner position of the brake control valve, a loading cavity 56 in the seating face of the main slide valve 9 is opened to the atmosphere through passage 57, port 58 in the main slide valve, cavity 59 in the auxiliary slide valve, port 60 in the main slide valve and an atmospheric passage 61. This is adapted to increase the seating pressure of the main slide valve, and its consequent resistance to movement, a degree sufficient to offset the pressure of spring 13, so that upon a reduction in the pressure differential acting on the piston 5 and even upon equalization of the pressures in valve chamber 7 and piston chamber 6, said piston and the slide valves 8 and 9 will remain in their inner position in which the flow of fluid under pressure to valve chamber 7 is retarded by the restricted port 46.

When the brake control valve device is in either the inner position or the full release position, the brake cylinder 1 is opened to the atmosphere through pipe and passage 62, cavity 63 in the main slide valve 9 and an atmospheric passage 64.

The charging valve diaphragm 21 is subject on one side to auxiliary reservoir pressure in chamber 23 and on the opposite side to brake pipe pressure in chamber 25. At the rear end of the train where the rate of increase in brake pipe pressure is slow, insufficient pressure differential is obtained on the diaphragm 21 to move it against the spring 52, but at the head end of the train, the rapid increase in brake pipe pressure deflects said diaphragm to the left hand position shown in Fig. 3, in which position a passage 51 is uncovered, the purpose of which will be hereinafter fully described. However, upon a substantial equalization of the opposing pressures on the diaphragm 21, the spring 52 returns the diaphragm and slide valve 26 to their normal position shown in Fig. 1.

In charging, fluid under pressure also flows from the brake pipe 19 through passage 20, chamber 40, ports 38 in the spring-pressed stop 39 to the emergency piston chamber 34, and with the emergency piston 33 in the release position, as shown in Fig. 1, fluid under pressure flows from chamber 34 past a ball check valve 65 and through passage 66 to valve chamber 35 and from thence to the quick action reservoir 4, thus charging said chamber and reservoir with fluid at brake pipe pressure.

In order to effect a service application of the brakes, the brake pipe pressure is gradually reduced in the usual manner, which permits the pressure of fluid in valve chamber 7 to shift the piston 5 to service position in which it engages a gasket 67. This movement of the piston 5 shifts the slide valves 8 and 9 to service position shown in Fig. 2. In service position, passage 41 is lapped in order to prevent flow of fluid from valve chamber 7 back to the brake pipe, and the port 43, through the auxiliary slide valve 8 registers with a port 68 in the main slide valve. The port 68 registers with the brake cylinder passage 62, so that fluid under pressure is permitted to flow from the auxiliary reservoir 2 and valve chamber 7 through passage and pipe 62 to the brake cylinder 1 and thus cause an application of the brakes to be effected.

Upon a gradual reduction in brake pipe pressure, the pressure of fluid in the emergency valve chamber 35 shifts the emergency piston 33 and auxiliary slide valve 36 toward the right until said piston engages the stop 39. In this position, a port 69 in the main slide valve 37 is uncovered by the auxiliary slide valve 36, which permits fluid under pressure to flow from valve chamber 35 and the connected quick action reservoir 4 to the atmosphere through passage 70 at the same rate as the brake pipe pressure is being reduced in piston chamber 34, thereby preventing further movement of the emergency piston to the right.

The charging valve device does not operate upon a reduction in brake pipe pressure in diaphragm chamber 25, since in its normal position, the spring 52 holds said valve in engagement with a fixed stop lug 71 in the casing, which lug limits movement in the right hand direction.

In order to effect the release of the brakes after a service application, the brake pipe pressure is increased by operation of the brake valve device on the locomotive. On cars at the front end of the train where the rate of increase in brake pipe pressure is rapid, the brake control valve device is shifted to its inner position and the charging valve device is shifted to its left hand position, as shown in Fig. 3 of the drawings, in the same manner as in initially charging.

In the inner position of the brake control valve device, fluid under pressure is supplied from the brake pipe 19 to the auxiliary reservoir 2 by way of passage 41, ports 46 and 42 in the main slide valve 9 and valve chamber 7. Fluid under pressure also flows from valve chamber 7 through port 43 in the auxiliary slide valve 8, port 44 in the main slide valve 9 and passage 54 to the lower side of the ball check valve 55 which, however, is held seated by the higher emergency reservoir pressure in passage 45. A cavity 47 in the main slide valve connects the emergency reservoir passage 45 to passage 48 so that fluid under pressure from the emergency reservoir 3 is supplied to passage 48 and flows therefrom past the check valve 50 to passage 51 leading to the seat of the charging valve slide valve 26. With the slide valve 26 in its left hand position, passage 51 is uncovered, which permits fluid at emergency reservoir pressure to flow from said passage to valve chamber 25 and from thence through passage 20 to brake pipe 19, thereby accelerating the charging of the brake pipe. After equalization of fluid under pressure from the emergency reservoir into the brake pipe and an increase in brake pipe pressure above the reduced emergency reservoir pressure, the check valve 50 prevents back flow from the brake pipe to the emergency reservoir and the emergency reservoir is then recharged with fluid under pressure from valve chamber 7, fluid under pressure flowing from said valve chamber past the ball check valve 55 and through passage and pipe 45.

It will be noted that with the brake control valve device in its inner position, the ball check valve 55 prevents flow of fluid under pressure from the emergency reservoir back to valve chamber 7 and the auxiliary reseroir 2, which is desirable in order to obtain the maximum recharge of the brake pipe by the fluid under pressure from said reservoir.

As hereinbefore described, the brake control device is maintained in the inner position against the pressure of spring 13 due to the loading cavity 56 being opened to the atmosphere through passage 57, port 58 in the main slide valve 9, cavity 59 in the auxiliary slide valve 8, port 60 in the main slide valve and the atmospheric passage 61. As a result, communication is maintained from the emergency reservoir 3 to passage 51 leading to the seat of the charging valve slide valve 26.

When the auxiliary reservoir pressure acting on one side of the charging valve diaphragm 21 becomes substantially equal to the brake pipe pressure acting on the other side of said diaphragm, the spring 52 deflects said diaphragm and moves the slide valve 26 to its normal position, shown in Fig. 1, in which passage 51 is lapped. With passage 51 lapped and the brake control device in the inner position shown in Fig. 3, fluid under pressure is prevented from flowing from the emergency reservoir 3 to the brake pipe 19 upon a reduction in brake pipe pressure as in initiating an application of the brakes. Also, in charging the brake pipe, after the brake valve device is moved from release position to running position and the brake pipe pressure reduces to normal, if the emergency reservoir happens to be overcharged to a pressure higher than the normal brake pipe pressure, fluid under pressure is prevented from flowing from the emergency reservoir to the brake pipe on account of passage 51 being lapped by slide valve 26.

At the rear end of the train where the rate of increase in brake pipe pressure is relatively slow, the brake control valve device is moved to the full release position, but the charging valve remains in its normal position as shown in Fig. 1.

In the full release position of the brake control device, fluid under pressure is supplied from the emergency reservoir 3 to the valve chamber 7 and auxiliary reservoir 2 by way of pipe and passage 45, port 44 in the main slide valve 9 and port 43 in the auxiliary slide valve 43. At the same time, fluid under pressure is supplied from the brake pipe 19 to the auxiliary reservoir 2 by way of passage 41, port 42 in the main slide valve 9 and valve chamber 7. After equalization of the pressures in the emergency reservoir 3 and auxiliary reservoir 2, both reservoirs are charged up to brake pipe pressure in the same manner as in initially charging, fluid under pressure flowing from valve chamber 7 through port 43 in the auxiliary slide valve 8, port 44 in the main slide valve 9 and passage and pipe 45.

It will here be noted that when the brake control valve device is in its inner position, fluid under pressure cannot flow from the emergency reservoir 3 to the valve chamber 7, since the passage 54, which establishes communication between valve chamber 7 and the emergency reservoir, in the inner position, contains check valve 55, which prevents such flow, but permits flow from the valve chamber 7 to the emergency reservoir.

It will also be noted that my improved valve device operates upon a rapid increase in brake pipe pressure, as at the front end of a train, to connect a normally charged reservoir to the brake pipe to accelerate the charging of the brake pipe, and upon a relatively slow rate of increase in brake pipe pressure, as at the rear end of the train, to connect said normally charged reservoir to the auxiliary reservoir to augment the recharging of said auxiliary reservoir, with the result that the recharge of the whole train is hastened and a more nearly synchronous release of the brakes is effected.

In both the full release position shown in Fig. 1, and the inner position shown in Fig. 3, fluid under pressure is vented from the brake cylinder 1 through pipe and passage 62, cavity 63 in the main slide valve 9 and the atmospheric passage 64, so as to effect a release of the brakes.

The increase in brake pipe pressure at both the front and rear of the train in effecting a release of the brakes, moves the emergency valve piston 33 to release position, in which position the valve chamber 35 and quick action reservoir 4 are charged with fluid at brake pipe pressure in the same manner as in initially charging.

When a sudden reduction in brake pipe pressure is produced in order to effect an emergency application of the brakes, the brake control valve device is shifted to its outer position in which fluid under pressure is supplied from the auxiliary reservoir 2 to the brake cylinder 1 as in effecting a service application of the brakes.

This sudden venting of fluid under pressure from the emergency piston chamber 34 permits quick action reservoir pressure in valve chamber 35 to shift the emergency piston 33 and slide valves 36 and 37 to emergency position in which the piston 33 engages a gasket 72, and a cavity 73 in the slide valve 37 connects the emergency reservoir passage 45 to the brake cylinder passage 62, which permits fluid under pressure to flow from the emergency reservoir 3 to the brake cylinder 1 and equalize with the auxiliary reservoir pressure in said brake cylinder, so as to produce a higher brake cylinder pressure than is obtained in a service application of the brakes.

In order to effect the release of brakes after an emergency application, the brake pipe pressure is increased in the usual manner and the valve devices operate in the same manner as in releasing the brakes after a service application of the brakes, except on account of emergency reservoir pressure being reduced and equal to auxiliary reservoir pressure, there is no flow from the emergency reservoir 3 to the auxiliary reservoir 2 at the rear end of the train, but at the front end of the train, the charging of the brake pipe is accelerated by flow of fluid at a reduced pressure from the emergency reservoir 3 to said brake pipe which was vented in effecting an emergency application of the brakes.

The subject matter relating to the feature of venting fluid under pressure from a reservoir to the brake pipe after an application of the brakes in order to facilitate the release of the brakes is broadly claimed in my pending application, Serial No. 612,465, filed May 20, 1932, which is in part a continuation of my application, Serial No. 487,988, filed October 11, 1930.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, and a reservoir normally charged with fluid under pressure, of a valve device movable upon a fast rate of increase in brake pipe pressure to a position for establishing a communication through which fluid under pressure first flows from said reservoir to said brake pipe so long as the reservoir pressure is higher than the brake pipe pressure, and for establishing another communication through which fluid under pressure then flows from said brake pipe to said reservoir only at a restricted rate as soon as the brake pipe pressure exceeds the reservoir pressure, said valve device being movable upon a slower rate of increase in brake pipe pressure to another position in which fluid under pressure is supplied from said brake pipe to said reservoir and said communication from said reservoir to said brake pipe is closed, and means for preventing back flow through said first mentioned communication from the brake pipe to said reservoir.

2. In a fluid pressure brake, the combination with a brake pipe, a reservoir normally charged with fluid under pressure, and a valve device subject to the opposing pressures of the brake pipe and a chamber and operative to one or the other of two different positions in accordance with the rate of increase in brake pipe pressure, said valve device being operative in one of said positions to establish a communication between said chamber and reservoir for permitting flow of fluid under pressure from one to the other and to supply fluid under pressure from said brake pipe to said chamber and to said reservoir, said valve device being operative in the other of said positions to establish a communication through which fluid under pressure is permitted to flow from said reservoir to said brake pipe and to establish another communication through which fluid under pressure supplied from said brake pipe to said chamber is permitted to flow from said chamber to said reservoir, and valve means interposed in the last mentioned communication for preventing flow of fluid under pressure from said reservoir to said chamber.

3. In a fluid pressure brake, the combination with a brake pipe, a normally charged reservoir, and a valve device operative upon an increase in brake pipe pressure to establish a communication through which fluid under pressure flows from said reservoir to said brake pipe and to establish another communication through which fluid under pressure is supplied from said brake pipe to said reservoir, a check valve interposed in each of said communications, and another valve device normally closing the first mentioned communication and operative upon an increase in brake pipe pressure to open the first mentioned communication.

4. In a fluid pressure brake, the combination with a brake pipe, and a normaly charged reservoir, of a brake control valve device operative in accordance with variations in brake pipe pressure for controlling the brakes on a car, said brake control valve device being operative to one or the other of two release positions, in accordance with the rate of increase in brake pipe pressure, for releasing the car brakes and for supplying fluid under pressure to said reservoir, and operative in one of said release positions to establish a communication through which fluid under pressure flows from said reservoir to said brake pipe, a check valve in said communication for preventing back flow from said brake pipe to said reservoir, and valve means for normally closing said communication and operative upon an increase in brake pipe pressure after either a service or an emergency application of the brakes for temporarily opening said communication.

5. In a fluid pressure brake, the combination with a brake pipe, and a reservoir normally charged with fluid under pressure, of a valve device for controlling the application and release of the brakes on a car and operative upon an increase in brake pipe pressure following either a service or an emergency application of the brakes to establish a communication through which fluid under pressure is supplied from said reservoir to said brake pipe and to establish another communication through which fluid under pressure is supplied from said brake pipe to said reservoir, a check valve for preventing back flow from said brake pipe to said reservoir through the first mentioned communication, and valve means positioned to prevent flow of fluid under pressure from said reservoir to said brake pipe through said communication when a reduction in brake pipe pressure is effected.

6. In a fluid pressure brake, the combination with a brake pipe, a chamber, and a reservoir normally charged with fluid under pressure, of a brake control valve device subject to the opposing pressures of the brake pipe and said chamber and operative in accordance with variations in brake pipe pressure to control the brakes, said brake control valve device being operative upon an increase in brake pipe pressure following either a service or an emergency rate of reduction in brake pipe pressure to establish a communication through which fluid under pressure is permitted to flow from said reservoir to said brake pipe and to establish another communication through which fluid under pressure is supplied from said brake pipe to said chamber and to said reservoir, a check valve in the first mentioned communication, and valve means normally closing the first mentioned communication and operative upon an increase in brake pipe pressure to open said first mentioned communication.

7. In a fluid pressure brake, the combination with a brake pipe, a brake cylinder, an auxiliary reservoir, and another reservoir normally charged with fluid under pressure, of a brake control valve device operative upon a reduction in brake pipe pressure to supply fluid under pressure from said auxiliary reservoir to said brake cylinder to effect an application of the brakes and operative upon an increase in brake pipe pressure to vent fluid under pressure from said brake cylinder to the atmosphere to effect a release of the brakes and to supply fluid under pressure to both of said reservoirs, said valve device being operative upon an increase in brake pipe pressure to a position for opening a communication through which fluid under pressure flows from said other reservoir to said brake pipe, a check valve for preventing back flow of fluid from said brake pipe to said other reservoir through said communication, and valve means subject to the opposing pressures of said auxiliary reservoir and said brake pipe for normally closing said communication and operative upon said increase in brake pipe pressure to open said communication, and another check valve for preventing back flow of fluid under pressure from said other reservoir to said auxiliary reservoir when said brake control valve device is in the above mentioned position.

8. In a fluid pressure brake, the combination with a brake pipe, an auxiliary reservoir and another reservoir normally charged with fluid under pressure, of a valve device operative upon the rapid rate of increase in brake pipe pressure at the head end of a train, in effecting a release of the brakes on the train, to establish a communication through which fluid under pressure is vented from said normally charged reservoir to said brake pipe, said valve device being operative upon the slower rate of increase in brake pipe pressure at the rear end of the train to establish a communication through which fluid under pressure is supplied from said normally charged reservoir to said auxiliary reservoir.

9. In a fluid pressure brake, the combination with a brake pipe, an auxiliary reservoir and another reservoir normally charged with fluid under pressure, of a valve device operative upon the rapid rate of increase in brake pipe pressure at the head end of a train, in effecting a release of the brakes on the train, to establish a communication through which fluid under pressure is vented from said normally charged reservoir to said brake pipe, and another communication through which fluid under pressure is supplied from said brake pipe to both of said reservoirs, a check valve operative upon a rapid rate of increase in brake pipe pressure to prevent flow of fluid under pressure from said normally charged reservoir to said auxiliary reservoir, said valve device being operative upon a slower rate of increase in brake pipe pressure at the rear end of the train to establish a communication through which fluid under pressure is supplied from said normally charged reservoir to said auxiliary reservoir and to supply fluid under pressure from said brake pipe to both of said reservoirs.

10. In a fluid pressure brake, the combination with a brake pipe, a brake cylinder, an auxiliary reservoir, and an additional reservoir, of a triple valve device comprising a main slide valve, an auxiliary slide valve mounted on and movable relatively to said main slide valve, and a piston for moving said slide valves and having movement relative to said main slide valve, said piston being controlled by the opposing pressures of said brake pipe and auxiliary reservoir and operative upon a reduction in brake pipe pressure to move said slide valves to a brake application position for supplying fluid under pressure from said auxiliary reservoir to said brake cylinder, and operative upon a certain rate of increase in brake pipe pressure to shift said slide valves to a normal release position for releasing fluid under pressure from said brake cylinder and establishing communication through which fluid under pressure is adapted to flow from said brake pipe and additional reservoir to said auxiliary reservoir, and operative upon a faster rate of increase in brake pipe pressure to shift said slide valves to an inner release position for releasing fluid under pressure from said brake cylinder and for establishing communication through which fluid under pressure is adapted to flow from said brake pipe to said auxiliary reservoir and from said auxiliary reservoir to said additional reservoir, said main slide valve having a plurality of passages, and said auxiliary slide valve having one port adapted to cooperate with various of said plurality of passages in said positions for establishing the communication through which fluid under pressure is supplied from the auxiliary reservoir to the brake cylinder, from the additional reservoir to said auxiliary reservoir and from said auxiliary reservoir to said additional reservoir.

CLYDE C. FARMER.